United States Patent [19]
Jones et al.

[11] Patent Number: 5,587,931
[45] Date of Patent: Dec. 24, 1996

[54] TOOL CONDITION MONITORING SYSTEM

[75] Inventors: Joel W. Jones; Ya Wu, both of Windsor, Canada

[73] Assignee: Tri-Way Machine Ltd., Windsor, Canada

[21] Appl. No.: 546,361

[22] Filed: Oct. 20, 1995

Related U.S. Application Data

[60] Provisional application No. 60/001,926, Apr. 8, 1995, abandoned.

[51] Int. Cl.$^6$ ............................. G05B 23/02; G08B 21/00
[52] U.S. Cl. ....................... 364/551.02; 73/660; 340/680; 364/474.15; 364/474.17
[58] Field of Search ............................. 364/551.02, 511, 364/474.12, 474.15, 474.16, 474.17, 474.19; 73/660, 104; 318/476; 340/660, 664, 679, 680

[56] References Cited

U.S. PATENT DOCUMENTS

| | | | |
|---|---|---|---|
| 3,694,637 | 9/1972 | Edwin et al. | 364/551.02 X |
| 4,351,029 | 9/1982 | Maxey et al. | 364/474.17 X |
| 4,471,444 | 9/1984 | Yee et al. | 364/474.17 |
| 4,748,554 | 5/1988 | Gebauer et al. | 364/474.19 X |
| 5,247,452 | 9/1993 | Ueda et al. | 364/474.17 |
| 5,407,265 | 4/1995 | Hamidieh et al. | 364/474.17 X |

OTHER PUBLICATIONS

Feature Extraction and Assessment Using Wavelet Packets for Monitoring of Machining Process, Wu et al., no date given.

Primary Examiner—Ellis B. Ramirez
Assistant Examiner—Edward Pipala
Attorney, Agent, or Firm—Howard & Howard

[57] ABSTRACT

A tool monitoring system monitors the condition of an electrically powered tool performing a cyclical operation. The tool monitoring system operates generally in two modes: learning mode and monitor mode. In learning mode, the tool monitoring system gathers statistical data on the power consumption of tools of the selected tool type during learning cycles. A power threshold is generated based upon the statistical data. The tool monitoring system then counts the number of crossings by each of the learning cycles of the power threshold and generates statistical data regarding the number of crossings. Preferably, the mathematical operation of wavelet packet transform is used to calculate the power threshold. Feature wavelet packets of the power consumption signal of the tool are calculated. The power consumption signal is then reconstructed from the feature wavelet packets and used to determine the power threshold. In monitor mode, the tool monitoring system counts the number of crossings of the power threshold by the power consumption signal of a tool in operation. The tool monitoring system identifies a worn tool when the number of crossings increases to a certain number relative to the crossings by the learning cycles.

18 Claims, 3 Drawing Sheets

TOOL CONDITION MONITORING SYSTEM

This application claims the benefit of U.S. Provisional application Ser. No. 60/001,926 filed Apr. 8, 1995, which is now abandoned.

BACKGROUND OF THE INVENTION

The present invention relates to a tool monitoring system for monitoring the condition of an electric motor driven tool performing a cyclical operation.

Tool condition monitoring is one of the major concerns in modern machining operations, especially in machining operations for mass production. Failure to detect tool failure and wear leads to poor product quality and can even damage machine tools. On the other hand, a false detection of tool failure or wear may cause an unnecessary interruption of an entire production. Both can result in significant monetary loss.

Known tool monitoring systems include systems for "on-line tool condition monitoring." In on-line tool condition monitoring, the tool is monitored for defects after each cut or cycle. These tool monitoring systems typically use optical sensors or laser optical sensors which measure the geometry of the tool after each cut. However, on-line tool condition monitoring can only detect catastrophic failure of a tool after a cut and cannot monitor the gradual wear of a tool or predict the tool's failure. Further, these systems are vulnerable to chips, coolant, and environmental noises.

Other known methods for tool condition monitoring attempt to predict tool condition based on various sensor signals such as cutting force, acoustic emission, and vibration. However, sensors for monitoring cutting force are too expensive to use with multiple stations and multiple spindles. Acoustic emission and vibration sensors require additional wiring and are vulnerable to various noises.

Some monitoring systems monitor power consumption (or motor current) of the tool. As the tool wears (or if it fails) its power consumption changes. However, the power signals are complicated and the power signals to provide a reliable, accurate indication of it has proven difficult to use. The power signal does contain some "noise" due to factors other than tool condition. Typically, these systems sets a range of signal that a monitored signal should fall within. When the monitored signal is outside this range, a worn tool or failure is indicated.

One major problem with monitoring the power consumption of the motor is that occasional spikes are experienced in a machine tool even under normal condition. The spikes can falsely indicate that the tool is worn. However, if the threshold is increased to prevent false signals, a worn tool may go undetected.

SUMMARY OF THE INVENTION

The present invention provides a real-time tool monitoring system for monitoring the condition of an electric motor driven tool performing a cyclical operation.

In the inventive tool monitoring system, an accurate dynamic threshold is generated by monitoring the actual power consumption of a machine tool of the selected tool type while the machine tool performs a plurality of machining cycles. The power consumption signal of the machine tool is decomposed into its time-frequency components and reconstructed based upon certain selected components in order to reduce the effects of noise. In the present invention it is also recognized that the power consumption signal of a machine tool in normal condition will include a number of spikes in each machine tool cycle. Accordingly, the tool monitoring system monitors the number of times the power consumption signal crosses a selected threshold, rather than indicating an alarm after a single crossing of a larger threshold.

The tool monitoring system of the present invention generally operates in two modes: learning mode and monitoring mode. In the learning mode, the tool monitoring system measures the power consumption signals of a certain number of samples (say 20, 50 or 100 samples) of the selected tool type as the tool performs the selected cyclical task. The tool is known to be a new tool or in a normal condition. The tool monitoring system then uses a mathematical technique known as wavelet packet transform to break the power consumption signal into components. The system selects the components that contain the bulk of the information about the overall signal, when using wavelet transforms, the selected components are the "feature wavelet packets." The selected components contain sufficient information about the original signal but not unnecessary or unwanted components such as noise. The feature wavelet packets of the power consumption signals of the learning cycle are then calculated.

The tool monitoring system then uses these feature wavelet packet to develop thresholds. In one method, the system calculates the inverse wavelet packet transform of the feature wavelet packets to reconstruct the power consumption signal of each learning sample. A power threshold, having an upper limit and a lower limit, is then generated based upon the reconstructed power consumption signals of the learning cycle. The power threshold is a function of time relative to the machine tool cycle. The power threshold is not the extremes of the signal, but rather some statistic functions of the signals. The signals of learning cycle will cross the threshold some number of times. The tool monitoring system then counts the number of crossings of the power threshold by the learning cycle power consumption signals and calculates their statistical properties.

In monitoring mode, the tool monitoring system continuously measures the power consumption signal of the tool performing the cyclical task. The tool monitoring system counts the number of crossings of the power threshold by the monitoring power consumption signal and compares the number of crossings to the statistical data regarding the number of crossings gathered from the learning mode. The tool monitoring system generates an alarm when the number of crossings of the power threshold by the power consumption signal increases to some predetermined amount relative to the number of crossings experienced in the learning mode.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DETAILED DESCRIPTION OF THE PREFERRED EMBODIMENT

Figure 1:
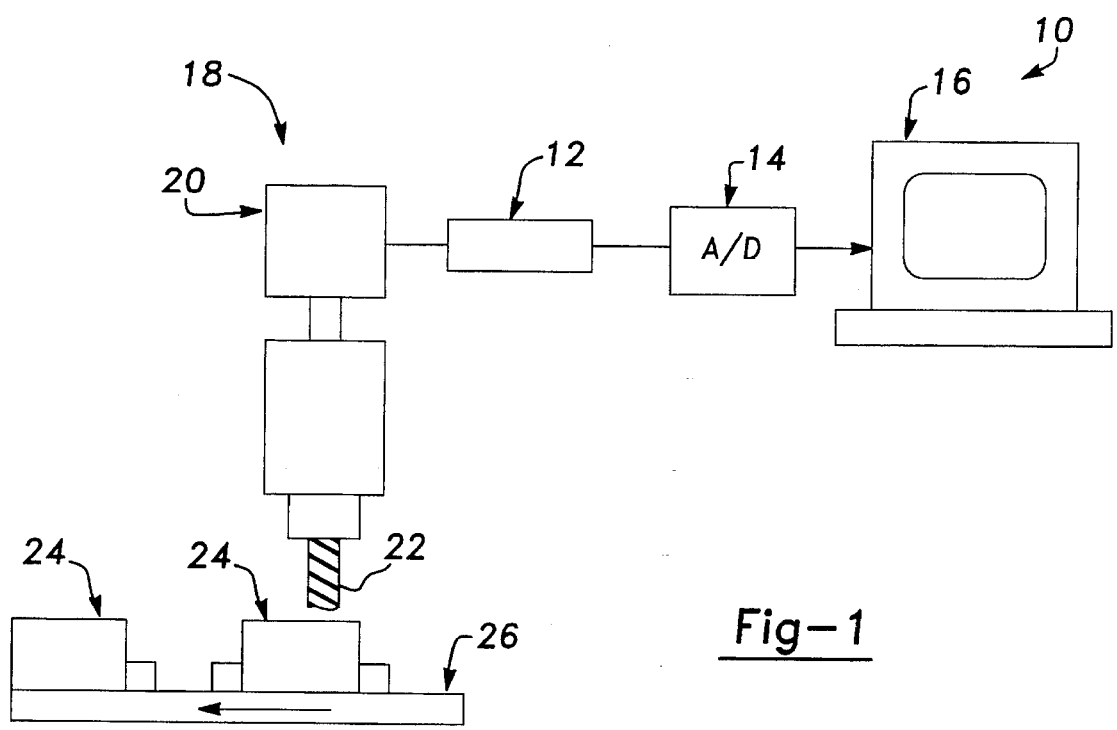
FIG. 1 illustrates a tool monitoring system according to the present invention, monitoring the power consumption of a machine tool machining a series of workpieces.

FIG. 1 shows a tool monitoring system 10 according to the present invention including a current transducer 12 connected to an analog-to-digital converter 14 and a CPU 16. The tool monitoring system 10 is shown monitoring a machine tool 18 having an electric motor 20 driving a tool 22. For purposes of illustration, the machine tool 18 is shown machining a series of workpieces 24 being moved along a conveyor system 26. As will become apparent, the tool monitoring system 10 of the present invention can be used with any selected tool type using an electric motor and performing a repetitive, cyclical task.

In operation, the motor 20 and tool 22 are repeatedly loaded to cut each workpiece 24, and then the conveyor system 26 positions another workpiece 24 to the machine tool 18. The current transducer 12 continuously indicates the power consumption of the motor 20 by sending a power consumption signal to the analog-to-digital converter 14, which converts the power consumption signal into a format readable by the CPU 16. The analog-to-digital converter 14 sends a digital signal representing the amplitude of the power consumption signal at a series of current time segments. The digitized power consumption signal is stored in the CPU 16 and associated with its particular time segment, relative to the machine tool cycle.

Figure 2:
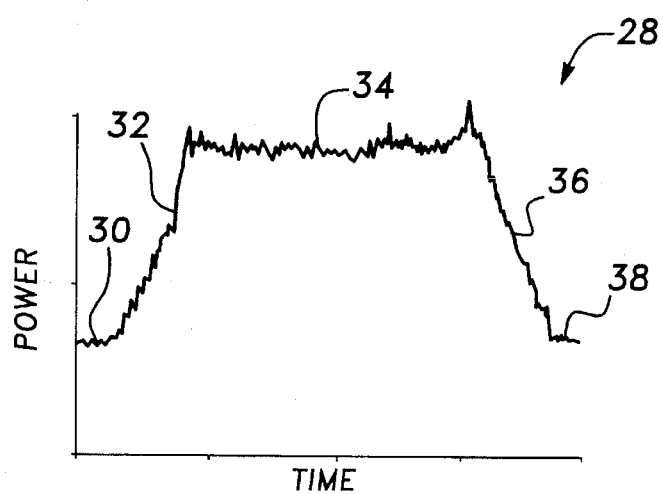
FIG. 2 illustrates the power signal from one cycle of the machine tool as received by the tool monitoring system of FIG. 1.

FIG. 2 shows one cycle of the power consumption signal 28 of the machine tool 18 of FIG. 1, as received by the CPU 16. The machining operation is in the form of a cycle starting from tool engagement and ending with tool withdrawal. At the beginning of the cycle, the tool 22 is not engaging the workpiece 24 and the power consumption signal 28 is at idling power 30. During the initial engagement 32 of the tool 22 with the workpiece 24, the power consumption signal 28 rises. When the tool 22 is fully engaged in the workpiece 24, the power consumption signal 28 reaches full engagement consumption 34. At full engagement 34, the power consumption signal 28 reaches a level and remains relatively unchanged, though there are fluctuations caused by various noise, such as cutting a hard spot in the workpiece 24. Due to this fluctuation, it has been difficult to use a power signal to accurately predict tool condition. A high "spike" in the signal from an unworn tool might be sometimes interpreted as a worn tool. The present invention overcomes this problem. After completion of machining the tool is withdrawn. During withdrawal 36 the power consumption signal 28 decreases steadily and finally returns to idling power 38.

The inventive tool monitoring system 10 is generally based upon the observation that the machine tool 18 will consume more power to perform the same work when it reaches a worn condition. As will be explained in detail below, the tool monitoring system 10 according to the present invention generally operates in two modes: a learning mode and a monitoring mode. In learning mode, the tool monitoring system 10 preferably receives data from several sample cycles of machine tools 18 of the selected tool type. Information related to the power consumption during each cycle run by each machine tool 18 is stored to develop expected signal ranges, or thresholds. Then in monitoring mode, the tool monitoring system 10 compares the power consumption signal of a machine tool 18 with data gathered in the learning mode and signals an alarm when the tool monitoring system 10 detects that the tool 22 is worn. The determination is made by comparing the signal to the expected learning cycle, signal ranges, or thresholds. Since the thresholds are developed by samples, they are more accurate than prior art "selected" thresholds.

Figure 3:
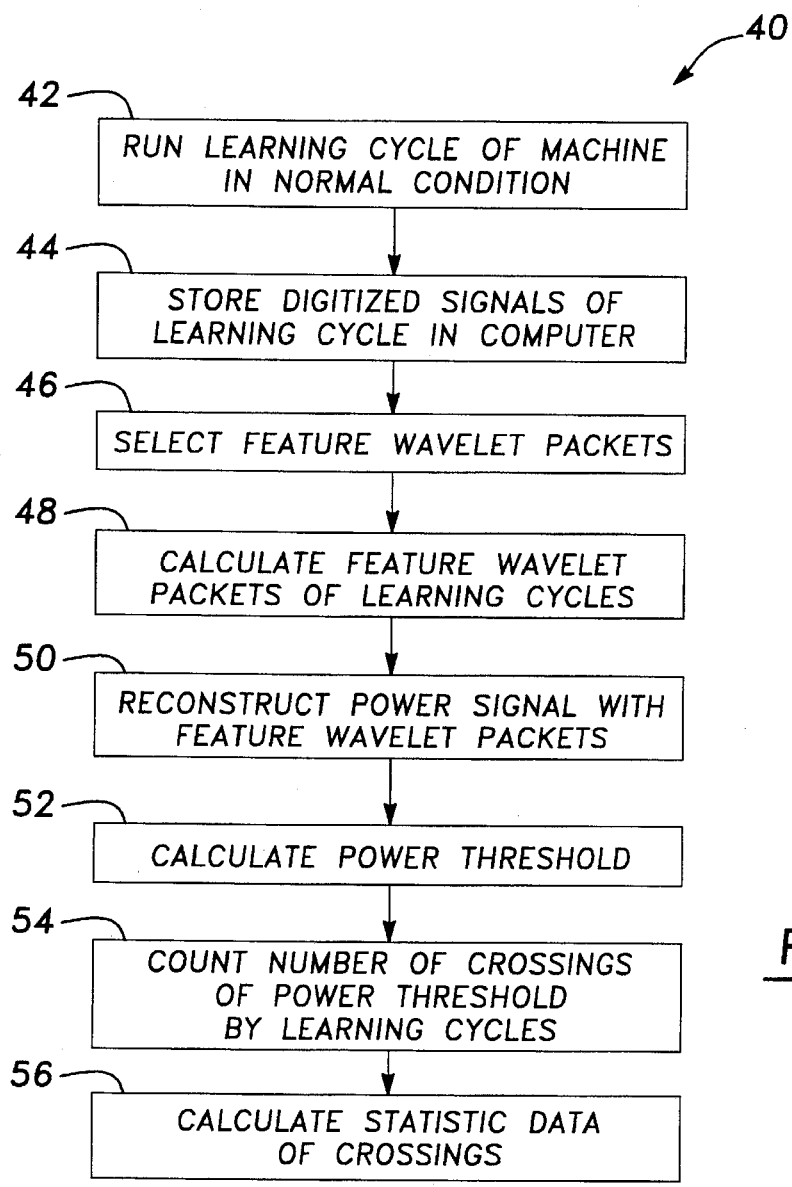
FIG. 3 is a flow chart of the tool monitoring system of FIG. 1 in its learning mode.

FIG. 3 shows a flow chart for the learning mode 40 of the tool monitoring system 10 of FIG. 1. In learning mode 40, numerous learning cycles of a plurality of tool 22 of the selected tool type are run in 42. The tool 22 is selected to be a new tool or in normal condition. The power consumption signals 28 of the learning cycle are digitized by the analog-to-digital converter 14 and stored in the CPU 16 in 44.

The CPU 16 then selects feature components of the power consumption signal 28 in 46. In one preferred embodiment, wavelet transforms are used to break the signal into components, as explained below. In 46, the samples of the learning cycle are decomposed into different time-frequency components. The feature wavelet packets are selected from the components to represent the main information about the original power consumption signal 28, thereby the unwanted components of the power consumption signal 28, i.e. noise are filtered out from the signal.

In 50, the CPU 16 reconstructs the power consumption signal 28 of each learning cycle from the selected feature wavelet packets by the inverse of the function used to break the original power signal into components. The reconstructed power consumption signal 28 then contains sufficient information from the original power consumption signal 28, but with reduced noise. Notably, while only some of the learning cycles need be used to select the feature wavelet packets in step 46, preferably all of the learning cycles are used to develop data at step 50. The more cycles utilized, the more accurate the system.

In 52, the CPU 16 generates a power threshold based upon statistical data calculated at 50 from the learning cycles. The power threshold is a function of time over the machine tool cycle and includes an upper limit and a lower limit. the upper and lower limits are not the extremes of the signal, but rather some statistic function of the signal. The learning cycle signals will occasionally exceed these thresholds.

In 54, the CPU 16 compares the power threshold to the power consumption signals of the learning cycles. The CPU 16 compares each power consumption signal to the power threshold at each time segment and counts the number of crossings by each power consumption signal. The crossings of the lower limit of the power threshold can be counted separately from the crossings of the upper limit of the power threshold, or as a separate number.

In 56, the CPU 16 calculates the statistic properties of crossings of the power consumption signals of the learning cycles. If the upper limit crossings are counted separately from lower limit crossings, the two means would also be calculated separately. The means and variances will be compared to the monitored signals. Since the system compares expected numbers of crossings, rather than looking for a single crossing, the occurrence of a few "spikes" in a monitored signal will not lead to a false indication that a tool is worn.

As mentioned, in the preferred embodiment, the power consumption signal 28 is broken into its components using wavelet packet transforms. Wavelet transform is a signal processing technique. The wavelet transform decomposes a signal into various components at different time scales and frequency bands, all of which form a surface in time-frequency plane. Both the time scale and the length of the frequency band can be changed, hence the characteristics of a signal can be magnified upon different resolutions.

The wavelet transform is more fully discussed in "Feature Extraction and Assessment Using Wavelet Packets for Monitoring of Machining Processes" by Ya Wu and R. Du, which is hereby incorporated by reference. In the preferred embodiment of the present invention, the CPU 16 calculates a discrete wavelet transform, specifically the wavelet packet transform. The wavelet transform is defined as follows:
Where the wavelet bases is:

$$W_s[f(t)] = \int_{-\infty}^{+\infty} f(\tau) \frac{1}{s} \Psi\left(\frac{t-\tau}{s}\right) d\tau$$

$$\Psi_{s\tau}(t) = \frac{1}{s} \Psi\left(\frac{t-\tau}{s}\right)$$

The wavelet transform can be considered as signal decomposition. It decomposes a signal f(t) into a family of wavelet bases, and the weighting coefficients, $W_s[f(t)]$, represent the amplitudes at given location t and frequency s. The wavelet transform is a time-frequency function which describes the information of f(t) in various time windows and frequency bands. It forms a three-dimensional figure against time-frequency plane. As a result, wavelet transform is capable of capturing non-stationary signals such as frequency variation and magnitude undulation.

The properties of wavelet transforms are determined by wavelet base functions. A number of wavelet base functions have been developed. When a wavelet base function, $\Psi(\cdot)$, is specified, its family, $\psi_{s\tau}(t)$, is called the wavelet bases.

For digital signals, discrete wavelet transforms can be used. In discrete wavelet transforms the frequency parameter, s, is taken as an integer power of two, i.e., $s=2^j$, $j=1, 2, \ldots$; and the time parameter, t, is taken as a series of integer k (i.e. $t \to k=1,2 \ldots$); that is:

$$\Psi_{jk}(t) = \frac{1}{2^j} \Psi\left(\frac{t}{2^j} - k\right), j, k = 1, 2, \ldots$$

One of the most commonly used discrete wavelet transform is binary orthogonal wavelet transform. Let $A_j[\cdot]$ and $D_j[\cdot]$ be a pair of operators. At jth resolution, $A_j[f(t)]$ is an approximation of the signal f(t) and $D_j[f(t)]$ represents the information loss, or the detail signal [5]. It has been verified [4]:

$$A_j[f(t)] = f(t) * \phi_j(t)$$

$$D_j[f(t)] = f(t) * \Psi_j(t)$$

where, $\phi_j(t)$ is a smooth scaling orthogonal bases, $\Psi_j(t)$ is an orthogonal wavelet bases, and "*" denotes convolution. Furthermore, $\phi_j(t)$ and $\Psi_j(t)$ are correlated through a pair of quadrature mirror filters h(t) and g(t) defined below:

$$\phi_j(t) = h(t) * \phi_{j-1}(t)$$

$$\Psi_j(t) = g(t) * \Psi_{j-1}(t)$$

In one embodiment of the present invention, a pair of 4th-order filters are used as defined below:

|      | t = 0   | t = 1   | t = 2    | t = 3    |
| ---- | ------- | ------- | -------- | -------- |
| h(t) | 0.48296 | 0.83692 | 0.22414  | −0.12941 |
| g(t) | 0.12941 | 0.22414 | −0.83652 | 0.48296  |

From the above equations, the discrete binary wavelet transform is then obtained:

$$A_j[f(t)] = h(t) * A_{j-1}[f(t)]$$

$$D_j[f(t)] = g(t) * A_{j-1}[f(t)]$$

or $$A_0[f(t)] = f(t)$$

$$A_j[f(t)] = \Sigma_k h(k-2t) A_{j-1}[f(t)]$$

$$D_j[f(t)] = \Sigma_k g(k-2t) A_{j-1}[f(t)]$$

where, $t=1, 2, \ldots, N$, $j=1, 2, \ldots, J$, and $J=\log_2 N$.

Since the wavelet transform is a complete representation of the signal, the original signal f(t) can be reconstructed by means of inverse wavelet transform or the reconstruction formula below:

$$A_j[f(t)] = 2\{\Sigma_k h(k-2t) A_{j+1}[f(t)] + \Sigma_k g(k-2t) * D_{j+1}[f(t)]\}$$

where, $j=J-1, J-2, \ldots, 1., 0$.

Let operators H and G be the convolution sum defined below:

$$H = \Sigma_k h(k-2t)$$

$$G = \Sigma_k g(k-2t)$$

Then, $$A_j[f(t)] = H A_{j-1}[f(t)]$$

$$D_j[f(t)] = G A_{j-1}[f(t)]$$

It is seen that the binary wavelet transforms uses H and G only on the approximation $A_{j-1}[f(t)]$ but not on the detail signal $D_{j-1}[f(t)]$. If the operators H and G are applied on both $A_{j-1}[f(t)]$ and $D_{j-1}[f(t)]$, then, it results in the wavelet packet transform. The wavelet packet transformation can be computed by the recursive algorithm below:

$$P_0^1(t) = f(t)$$

$$P_j^{2i-1}(t) = H P_{j-1}^i(t)$$

$$P_j^{2i} = G P_{j-1}^i(t)$$

where $$P_j^i(t)$$

is the ith packet on the jth resolution, $t=1, 2, \ldots, 2^{J-j}$, $i=1, 2, \ldots, 2^j$, $j=1, 2, \ldots J$, $J=\log_2 N$.

The original signal f(t) can be reconstructed by the inverse wavelet transform below:

$$P_j^i(t) = 2[\overline{H}P_{j+1}^{2i-1}(t) + \overline{G}P_{j+1}^{2i}(t)]$$

where, $j = J-1, J-2, \ldots, 1, 0$; $i = 2^j, 2^{j-1}, \ldots, 2, 1$, and the operators $\overline{H}$ and $\overline{G}$ are the conjugate of H and G:

$$H = \Sigma_k h(t-2k)$$

$$G = \Sigma_k g(t-2k)$$

Returning to the learning cycle as shown in FIG. 3, at step 46, the CPU 16 calculates all of the wavelet packets to select the feature wavelet packages. As will be shown wavelet packet transforms result in breaking a complex signal into a number of components, with only a few of the components carrying the bulk of the signal information.

Figure 4:
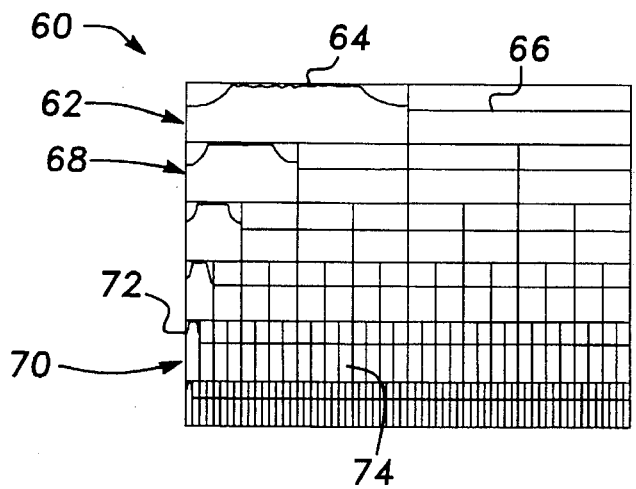
FIG. 4 is the wavelet packet transform of the signal of FIG. 2.

FIG. 4 shows the wavelet transform 60 of the power consumption signal 28 of FIG. 2. As can be seen from the figure, the wavelet transform 60 calculated to a first resolution 62 is decomposed into a first packet 64 and a second packet 66. The first packet includes most of the information, while the second packet generally includes background noise. At a second resolution 68, the wavelet transform 60 comprises four packets. At each resolution, the wavelet packets contain the complete information for the original signal. In one embodiment, the CPU 16 calculates the wavelet transform 60 to at least its fifth resolution 70, which comprises 32 packets. From this calculation, one can determine that at the fifth resolution, the first packet, $P_5^1(t)$ represents the trapezoid trend and the 11th packet, $P_5^{11}(t)$ represents the dynamic wave. These two wavelet packets may then be selected as the feature wavelet packets. The feature wavelet packets can be selected by taking the wavelet packets containing the most information, or the most energy. Increasing the number of wavelet packets selected increases the accuracy to which the components represent the original signal, however, the more packets that are selected the more complicated the calculation becomes. The number of wavelet packets can be increased until the desired accuracy is achieved.

In step 50, the CPU 16 performs the inverse wavelet packet transform on the feature wavelet packets, while setting the other packets to zero. Setting the other packets to zero eliminates noise from the signal. The reconstructed signal 76 of one of the learning cycles, shown in FIG. 5, therefore comprises the principal components of the power consumption signal 28, without the unwanted components such as various noises.

Figures 5, 6:
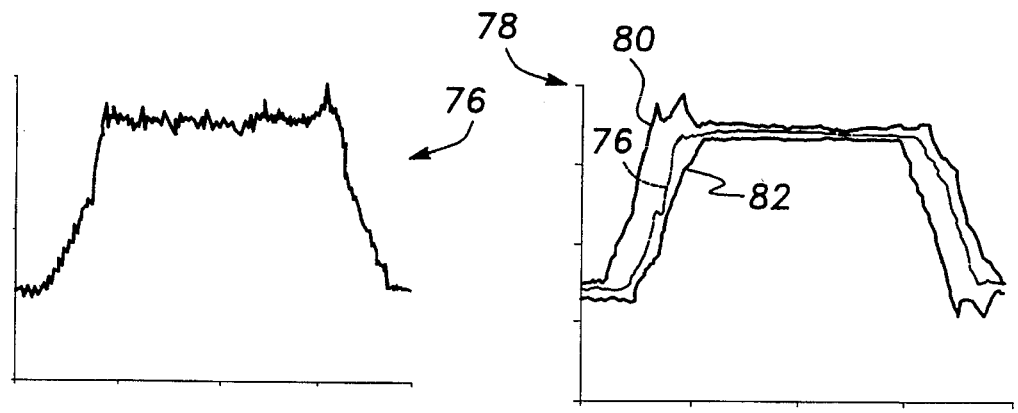
FIG. 5 is a reconstructed power consumption signal of FIG. 2, reconstructed from the feature wavelet packets selected from FIG. 4.
FIG. 6 is a power threshold based upon several reconstructed power consumption signals of the learning cycles.

In step 52, the CPU 16 generates a power threshold 78, as shown in FIG. 6, which is based upon statistical properties from the reconstructed power consumption signals 76 from the learning cycles. The mean and standard deviation of the reconstructed power signals 76 are calculated at each time segment relative to the machine tool cycle. Therefore, both the mean power consumption signal and the standard deviation are functions of time over one machine tool cycle. The power threshold includes an tapper limit 80 and a lower limit 82, which are both functions of time over the machine tool cycle. The thresholds are selected to be some function of the mean and standard deviation of the learning cycles signals. In this embodiment upper limit 80 and lower limit 82 are preferably calculated as plus and minus a certain number of standard deviations from the mean of the reconstructed power consumption signals 76 of the learning cycles.

In step 54, the CPU 16 compares the power consumption signal 76 from the learning cycles with the power threshold 78. One of the power consumption signals 76 from the learning cycles is shown in FIG. 6. In practice, the power consumption signals from numerous learning cycles would be compared with the power threshold 78. Notably, the signal in FIG. 6 is shown crossing the thresholds. The CPU 16 counts the number of crossings by the power consumption signals 28 of the learning cycles of the upper limit 80 and lower limit 82 of the power threshold 78. The CPU 16 then determines the mean number of crossings by the learning cycle signals in step 56. The upper limit 80 crossings can be counted separately from the lower limit crossings 82, or a composite number.

Figure 7:
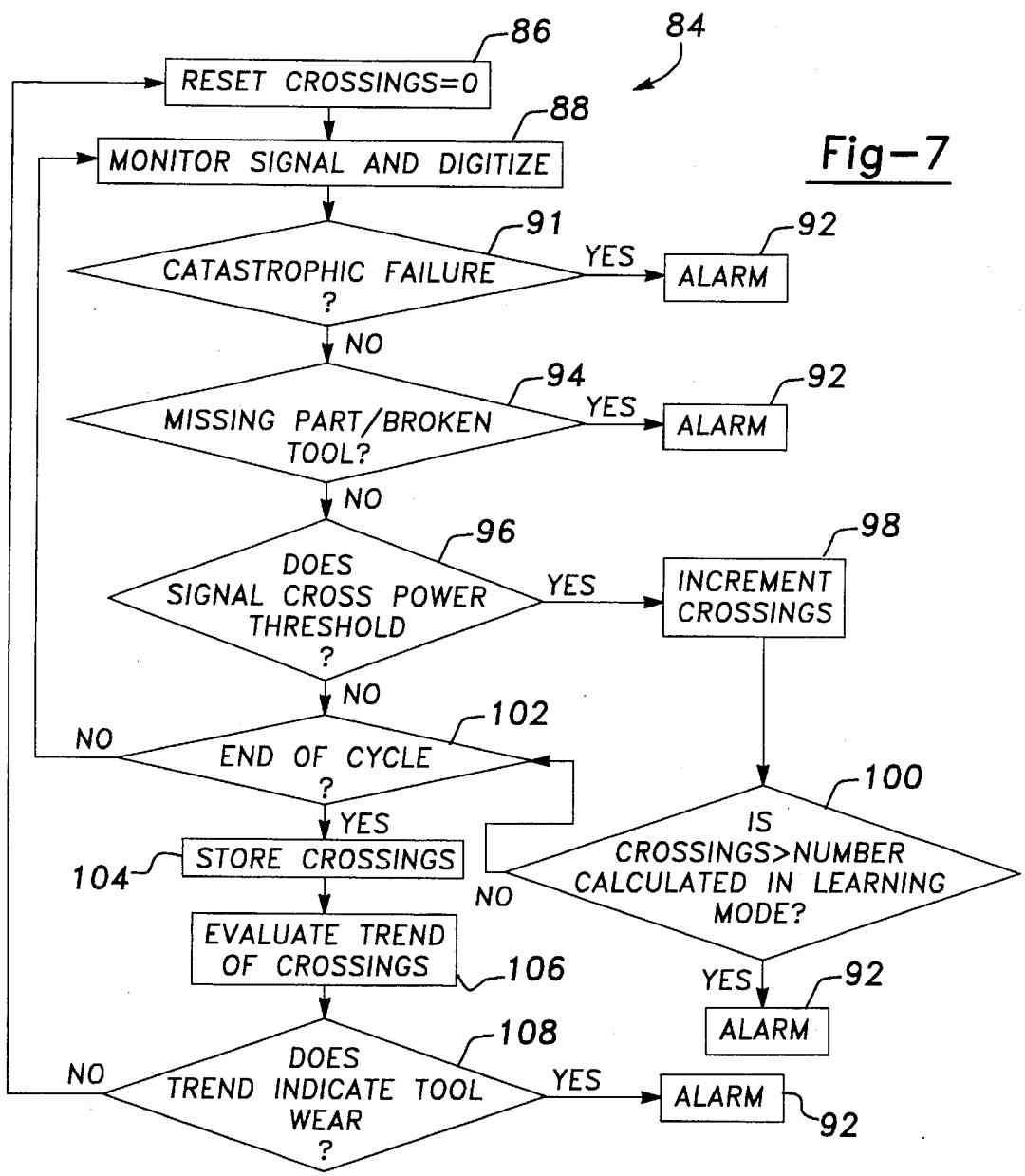
FIG. 7 is a flow chart of the tool monitoring system of FIG. 1 in monitor mode.

After creating a power threshold 78 and statistical data from crossings of the power threshold in learning mode 40, the tool monitoring system 10 enters the monitoring mode 84, shown in FIG. 7. In monitor mode 84, the tool monitoring system 10 is again connected to a machine tool 18 of the selected tool type as shown in FIG. 1. Preferably, the same CPU 16 is used in both the learning mode 40 and monitor mode 84, however, it is recognized that the power threshold 78 data could be downloaded to a different CPU for the monitor mode. Moreover, it is preferred that the learning mode be performed at the actual work station where the CPU will be monitoring. Using the actual workstation for the learning mode will insure that any individual characteristics of the motor, tool mounts, etc. will be accounted for in the thresholds.

In monitor mode 84, as shown in FIG. 7, the CPU 16 keeps a counter, "Crossings", which is initially set to zero in step 86. The CPU 16 monitors the power consumption signal 28 of the machine tool 18 while the machine tool 18 performs its repetitive cyclical machining operations in 88.

In step 91, the CPU 16 compares the power consumption signal of the machine tool 18 to a catastrophic threshold. The catastrophic threshold is chosen to be much larger than the power threshold 78. It can be based upon the data gathered in the learning mode 40 or can be determined beforehand. The catastrophic threshold is selected to be so high, as to only be met when there is a severe failure. If the power consumption signal 28 crosses the catastrophic threshold at any time, the CPU 16 signals an alarm in step 92 which immediately ceases the machining operation and disengages the motor 20 and spindle 22.

In step 94, the CPU 16 monitors whether the power consumption signal 28 fails to rise above the idling power 30 in the time segments of the cycle corresponding to the initial engagement of the tool with the workpiece 24. This indicates that the workpiece 24 is missing or that the tool 22 is broken. If so, the CPU 16 signals an alarm 92. This threshold can be based upon the data gathered in the learning mode 40 or can be determined beforehand.

The CPU 16 then determines whether the power consumption signal 28 crosses the power threshold 78 in 96. If the power consumption signal 28 crosses the power threshold 78, the CPU increments the counter, Crossings, in step 98. In step 100, during a cutting cycle, as soon as the counter indicates that the number of crossings by the power consumption signal 28 of the power threshold 78 is more than of crossings calculated in the learning mode, the CPU 16 indicates an alarm 92. Since the crossings are counted during a cutting cycle, the number of crossings can be compared to statistical data from the learning mode before the end of the cycle, i.e. the number of crossings can be compared for selected fractions of the cutting cycle.

In 102, if the CPU 16 detects that the machine tool 18 has not completed a cycle, the CPU 16 return to step 88 to monitor the next time segment of the power consumption signal. If the end of a cycle is detected, then the number of crossings, which is stored in "Crossings", is stored with a predetermined number of previous numbers of crossings.

In step 106, the CPU evaluates the trend of the number of crossings by the power consumption signal 28. If the number of crossings is increasing steadily over the previous predetermined number of cycles, this would indicate that the machine tool 18 is worn and heading towards failure. The CPU 16 may indicate an alarm 92.

If the end of a cycle is detected in 102, and the trend of crossings does not indicate tool wear in 106, the counter, Crossings, is reset in step 86 and the tool monitoring system 10 monitors the next cycle.

Note that all of the steps above require only one addition and comparison, therefore they can be performed within the time interval of two monitoring sample points, so that it can be used for real-time monitoring. Moreover, the present tool monitoring system 10 accurately predicts tool failure by selecting a threshold and dealing with the effects of various noises in several ways. The tool monitoring system monitors only selected components of the power consumption signal to eliminate the effects of unwanted noise. In recognizing that the power consumption signal of a tool in normal condition will have a number of spikes, the tool monitoring system monitors the number of crossings of the chosen power threshold, rather than indicating an alarm after a single crossing of a larger power threshold. Further, by basing the threshold on statistical data from the power consumption signal from learning cycles, the power threshold is an accurate function of time over the machining cycle.

It should be understood that this invention can be broadly utilized in a number of distinct fashions. As one example, the learning cycle could be performed with the first several cycles of each new tool. Thus, the system could be placed in a new tool, and can recalculate its thresholds with the first several cycles, which will be known to be operations on a new tool. With such a system, there is also the alternative for including in the memory of the controller an estimate of what the thresholds typically arrived at for the particular type of tool. Thus, when the tool begins to set its own thresholds based on its actual learning cycle, it will be modified from this predicted threshold. Moreover, these predicted thresholds are utilized during the first several cycles to predict catastrophic failure, as described above.

With regard to the actual monitoring of the tool during its cyclical operation, it is anticipated that the actual monitored signals will not need to be broken into components. That is, the actual raw signals can simply be compared to the power thresholds in a real-time fashion. This greatly simplifies the calculation and required times to determine when a tool is worn. In such a system, some simple adjustment of the thresholds as calculated from the learning cycles may be necessary to include the effect of the removed information from the learning cycles. This adjustment may be as simple as adding some fixed amount to the thresholds to account for that which was removed to create the thresholds.

Alternatively, it may also be preferable to take only components of the signal that is being monitored and compare those components to the thresholds. That is, the actual monitoring of the tool may utilize the same method steps that were used to create the thresholds in its learning cycle.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A method for monitoring the condition of an electrically powered tool of a selected tool type performing a cyclical task comprising the steps of:
   a. using a tool to perform a cyclical task and measuring a power consumption signal of said tool as said tool performs said cyclical task;
   b. decomposing said power consumption signal of said tool into components by converting said power consumption signal into time segments, each time segment having a digital value equivalent to the analog value of said signal at said time, and decomposing said time segments of said power consumption signal into different frequency components using a mathematical algorithm;
   c. selecting feature components of said power consumption signal;
   d. using said selected components of said power consumption signal to set a power threshold in a learning cycle;
   e. using a tool to perform a cyclic task and monitoring its power consumption signal; and
   f. identifying a worn condition of the tool of step e. based upon a comparison of said power consumption signal with said predetermined power threshold of step d.

2. The method for monitoring of claim 1, wherein the selected components of said step c. are reconstructed prior to said step d.

3. The method for monitoring of claim 1, wherein said step b. includes the step of applying said power consumption signal of said tool to a plurality of filters.

4. The method for monitoring of claim 1, wherein the decomposition of the signal includes the step of calculating wavelet packet transforms of said power consumption signal.

5. The method for monitoring of claim 1, wherein said power consumption signal of step e. is not decomposed prior to step f.

6. The method for monitoring of claim 1, wherein said step f. includes the steps of counting the number of crossings of said power threshold by said power signal, and comparing the number of crossings to an expected number of crossings.

7. A method for monitoring the condition of an electric motor powered tool of a selected tool type comprising the steps of:
   a. using a tool to perform a cyclical task, and measuring a power consumption signal of said tool as said tool performs a cyclical task;
   b. generating a power threshold based upon said power consumption signal of said step a.;
   c. using a tool to perform a cyclical task, and measuring the power consumption signal of said tool said tool performs said cyclical task;
   d. comparing said power consumption signal of step c. to said power threshold by counting the number of crossings of said power threshold by said power consumption signal of said tool in step a., and counting the number of crossings of said power threshold by said power consumption signal of said tool in step c; and
   e. signalling a worn condition of said tool of step c when said power consumption signal of step c. reaches a predetermined level relative to said power threshold, said predetermined level being defined by when said crossings of said tool of step c. exceed said crossings of said tool of step a. by a predetermined amount.

8. The method for monitoring of claim 7, wherein both upper and lower thresholds are generated in said step b.

9. The method for monitoring of claim 8, wherein extreme thresholds are also set outside of said upper and lower thresholds, and signalling a failure should said power consumption signal of step c. exceed said extreme thresholds once.

10. The method for monitoring of claim 7, wherein said tool signals of said step b. are generated using a plurality of sample cycles.

11. The method of monitoring of claim 7, wherein said tools of steps a. and c. are the same tool.

12. The method for monitoring of claim 7, wherein said step b. includes the steps of:

converting said power consumption signal of said tool into time segments, each time segment having a digital value equivalent to the analog value of said signal at said time;

calculating wavelet packets of said power consumption signal of said tool; and reconstructing said power consumption signal of said tool by calculating inverse wavelet packet transform based on selected wavelet packets.

13. A method for monitoring the condition of an electric motor powered tool of a selected tool type comprising the steps of:

a. selecting a power threshold;

b. using a tool to perform a cyclical task, and measuring a power consumption signal of said tool as said tool performs said cyclical task;

c. counting the number of crossings of said power threshold by said power consumption signal of a learning cycle tool of said selected tool type, counting the number of crossings of said power threshold by said power consumption signal of said tool; and d. signalling a worn condition of said tool when said crossings of said tool exceed said crossings of said learning cycle tool by a predetermined amount in a predetermined time frame.

14. The method for monitoring of claim 13, wherein said step a. includes the steps of:

measuring a power consumption signal of said learning cycle tool as it performs a cyclical task; and generating a power threshold based upon said power consumption signal of said learning cycle tool.

15. The method for monitoring of claim 14, wherein said tools of steps a. and b. are the same tool.

16. A method for monitoring the condition of an electric motor powered tool of a selected tool type comprising the steps of:

a. using a first tool to perform a plurality of cyclical tasks, and measuring a power consumption signal of said first tool as said first tool performs said plurality of cycles of cyclical task;

b. decomposing said power consumption signal of each said cycle of said first tool into components;

c. selecting feature components of said components of said power consumption signal;

d. reconstructing said power consumption signal from said feature components;

e. generating a power threshold based upon said reconstructed power consumption signal of said first tool, said power threshold including an upper limit for said power consumption signal;

f. counting the number of crossings of said power threshold by said power consumption signal of said first tool while performing a plurality of cycles of said cyclical task;

g. using a second tool to perform said cyclical task, and measuring the power consumption signal of said second tool as said second tool performs said cyclical task;

h. counting the number of crossings of said power threshold by said power consumption signal of said second tool;

i. comparing the number of crossings of said power threshold by said second tool with the number of crossings of said power threshold by said first tool; and j. signalling a worn condition of said second tool when the number of crossings of said power threshold by said second tool exceeds the number of crossings of said power threshold of said first tool by a predetermined amount in a predetermined time frame.

17. The method for monitoring the condition of an electrically powered tool of claim 16, wherein said steps b–d include the steps of:

calculating feature wavelet packets of said power consumption signal of said first tool; and reconstructing said power consumption signal from the inverse wavelet packet transform of the feature wavelet packets.

18. The method for monitoring the condition of an electrical power tool of claim 16, wherein said first and second tools are the same tool.

* * * * *